(12) United States Patent
Endo et al.

(10) Patent No.: US 12,282,583 B2
(45) Date of Patent: Apr. 22, 2025

(54) INFORMATION PROCESSING DEVICE, INFORMATION PROCESSING METHOD AND STORAGE MEDIUM

(71) Applicant: TOYOTA JIDOSHA KABUSHIKI KAISHA, Aichi-ken (JP)

(72) Inventors: Masato Endo, Nagoya (JP); Yukinori Ii, Toyota (JP); Yasuyuki Kamezaki, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 395 days.

(21) Appl. No.: 17/734,118

(22) Filed: May 2, 2022

(65) Prior Publication Data

US 2022/0405421 A1 Dec. 22, 2022

(30) Foreign Application Priority Data

Jun. 22, 2021 (JP) ................. 2021-103403

(51) Int. Cl.
| | | |
|---|---|---|
| G06F 21/00 | (2013.01) | |
| G06F 21/62 | (2013.01) | |
| G06Q 30/0207 | (2023.01) | |
| G06Q 50/26 | (2012.01) | |
| G07C 5/00 | (2006.01) | |
| G07C 5/08 | (2006.01) | |
| G06V 20/59 | (2022.01) | |
| G06V 40/16 | (2022.01) | |

(52) U.S. Cl.
CPC ..... *G06F 21/6245* (2013.01); *G06Q 30/0236* (2013.01); *G06Q 50/265* (2013.01); *G07C 5/008* (2013.01); *G07C 5/0808* (2013.01); *G06V 20/59* (2022.01); *G06V 40/172* (2022.01)

(58) Field of Classification Search
CPC ............ G06F 21/6245; G06Q 30/0236; G06Q 50/265; G06Q 10/06398; G06Q 50/40; G07C 5/008; G07C 5/0808; G06V 20/59; G06V 40/172; G01D 21/02
See application file for complete search history.

(56) References Cited

U.S. PATENT DOCUMENTS

| | | | |
|---|---|---|---|
| 2019/0286843 A1* | 9/2019 | Fukuhara | ............ G06F 21/6245 |
| 2020/0160076 A1 | 5/2020 | Suzuki et al. | |
| 2020/0265655 A1* | 8/2020 | Ha | .......................... H04W 4/40 |
| 2020/0273073 A1 | 8/2020 | Takebayashi | |

FOREIGN PATENT DOCUMENTS

| | | |
|---|---|---|
| JP | 2008-252624 A | 10/2008 |
| JP | 2015-108854 A | 6/2015 |
| JP | 2020-86762 A | 6/2020 |
| JP | 2020-135813 A | 8/2020 |

* cited by examiner

*Primary Examiner* — Meredith A Long
(74) *Attorney, Agent, or Firm* — HAUPTMAN HAM, LLP

(57) ABSTRACT

An information processing device includes: an acquisition unit that acquires vehicle information relevant to a vehicle; an identification unit that identifies a driver of the vehicle based on the vehicle information acquired by the acquisition unit; a management unit that manages a plurality of pieces of driver information relevant to the driver identified by the identification unit; and an acceptance unit that accepts a selection about a management method for the driver information by the management unit.

8 Claims, 10 Drawing Sheets

INFORMATION PROCESSING DEVICE, INFORMATION PROCESSING METHOD AND STORAGE MEDIUM

CROSS-REFERENCE TO RELATED APPLICATION

This application claims priority to Japanese Patent Application No. 2021-103403 filed on Jun. 22, 2021, incorporated herein by reference in its entirety.

BACKGROUND

1. Technical Field

The present disclosure relates to an information processing device, an information processing method and a storage medium.

2. Description of Related Art

Japanese Unexamined Patent Application Publication No. 2020-086762 (JP 2020-086762 A) discloses an evaluation system, an evaluation method and a program that make it possible to evaluate the social credibility of an occupant.

SUMMARY

In the technology in JP 2020-086762 A, an image photographed by a camera, a detection result of a vehicle sensor and the like are analyzed by an on-board device, and an analysis result relevant to driving of a driver is sent to an evaluation server at a predetermined timing.

However, the above analysis result can include information that the driver of the vehicle does not want to provide (for example, information that makes it possible to individually identify the driver), and therefore, it is undesirable to allow an external device to unrestrictedly acquire information relevant to the driver without the agreement of the driver.

Hence, the present disclosure has an object to provide an information processing device, an information processing method and a storage medium that make it possible to collect the information relevant to the driver with consideration for personal information when the information relevant to the driver is used for analysis or the like.

An information processing device according to claim 1 includes: an acquisition unit that acquires vehicle information relevant to a vehicle; an identification unit that identifies a driver of the vehicle based on the vehicle information acquired by the acquisition unit; a management unit that manages a plurality of pieces of driver information relevant to the driver identified by the identification unit; and an acceptance unit that accepts a selection about a management method for the driver information by the management unit.

In the information processing device according to claim 1, the acquisition unit acquires the vehicle information. Further, the identification unit identifies the driver of the vehicle based on the vehicle information acquired by the acquisition unit. Further, the management unit manages the plurality of pieces of driver information relevant to the driver identified by the identification unit. Then, the acceptance unit accepts the selection about the management method for the driver information by the management unit. Thereby, in the information processing device, it is possible to collect the information relevant to the driver with consideration for personal information when the information relevant to the driver is used for analysis or the like.

An information processing device according to claim 2, in claim 1, further includes: a decision unit that decides whether to give an advantageous benefit to the driver, based on an evaluation value of the driver; and an update unit that updates the evaluation value, such that the decision by the decision unit becomes closer to a decision of giving the benefit as the number of pieces of the driver information is larger.

In the information processing device according to claim 2, the decision unit decides whether to give the advantageous benefit to the driver, based on the evaluation value of the driver. Then, the update unit updates the evaluation value, such that the decision by the decision unit becomes closer to the decision of giving the benefit as the number of pieces of the driver information is larger. Thereby, in the information processing device, as the number of pieces of the driver information is larger, the decision becomes closer to the decision of giving the benefit, and therefore it is possible to give a motivation to provide more pieces of the driver information.

An information processing device according to claim 3, in claim 1 or 2, the acceptance unit accepts a selection of a single plan from a plurality of plans about combination of the driver information managed by the management unit, and the management unit manages the driver information that corresponds to the single plan accepted by the acceptance unit.

In the information processing device according to claim 3, the acceptance unit accepts the selection of the single plan from the plurality of plans about the combination of the driver information managed by the management unit. Then, the management unit manages the driver information that corresponds to the single plan accepted by the acceptance unit. Thereby, in the information processing device, by accepting the selection of the single plan from the plurality of plans, it is possible to reduce the complication when the selection about the management method by the management unit is performed for each piece of the driver information.

In an information processing device according to claim 4, in any one of claims 1 to 3, when the driver information is provided to an outside, the acceptance unit accepts a permission or rejection of provision of the driver information to the outside.

In the information processing device according to claim 4, when the driver information is provided to the outside, the acceptance unit accepts the permission or rejection of the provision of the driver information to the external device. Thereby, in the information processing device, it is possible to select the permission or rejection of the provision of the driver information to an external device that is different from the information processing device.

In an information processing device according to claim 5, in claim 4, when the driver information is provided to the outside, the acceptance unit accepts the permission or rejection of the provision to the outside, for each piece of the driver information.

In the information processing device according to claim 5, when the driver information is provided to the outside, the acceptance unit accepts the permission or rejection of the provision to the outside, for each piece of the driver information. Thereby, in the information processing device, it is possible to select the permission or rejection of the provision to the external device that is different from the information processing device, for each piece of the driver information.

In an information processing method according to claim 6, a computer executes a process including: acquiring vehicle information relevant to a vehicle; identifying a driver of the vehicle based on the acquired vehicle information; managing a plurality of pieces of driver information relevant to the identified driver; and accepting a selection about a management method for the driver information.

A storage medium according to claim 7 stores an information processing program for causing a computer to execute a process including: acquiring vehicle information relevant to a vehicle; identifying a driver of the vehicle based on the acquired vehicle information; managing a plurality of pieces of driver information relevant to the identified driver; and accepting a selection about a management method for the driver information.

As described above, the information processing device, information processing method and storage medium according to the present disclosure make it possible to collect the information relevant to the driver with consideration for personal information when the information relevant to the driver is used for analysis or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

An information processing system 10 according to a first embodiment will be described below. The information processing system 10 according to the first embodiment is a system that accepts a selection about a management method for information relevant to a driver.

Figure 1:
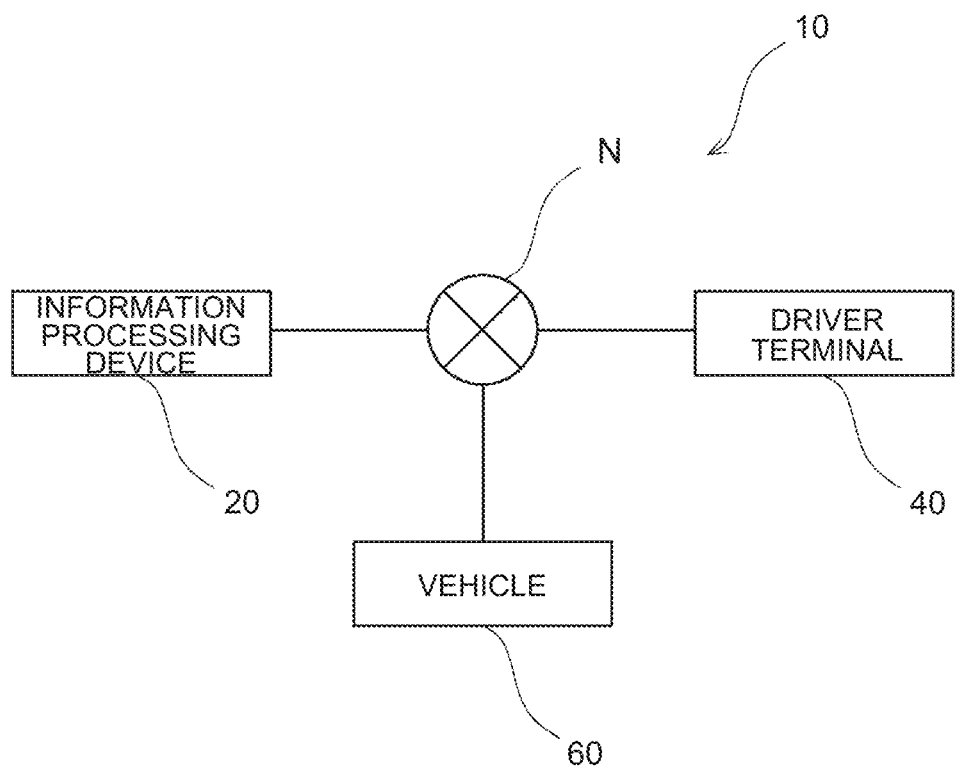
FIG. 1 is a diagram showing a schematic configuration of an information processing system according to an embodiment.

FIG. 1 is a diagram showing a schematic configuration of an information processing system 10. As shown in FIG. 1, the information processing system 10 includes an information processing device 20, a driver terminal 40 and a vehicle 60. The information processing device 20, the driver terminal 40 and the vehicle 60 are connected through a network N, and can communicate with each other.

The information processing device 20 is a server computer that is possessed by a predetermined business operator. The driver terminal 40 is a portable terminal that is possessed by a driver of the vehicle 60. For example, a portable personal computer (notebook PC), a smartphone, a tablet terminal or the like is applied as the driver terminal 40. In the first embodiment, as an example, the driver terminal 40 is a smartphone.

The vehicle 60 may be a gasoline vehicle, a hybrid electric vehicle or a battery electric vehicle. In the first embodiment, as an example, the vehicle 60 is a gasoline vehicle.

Figure 2:
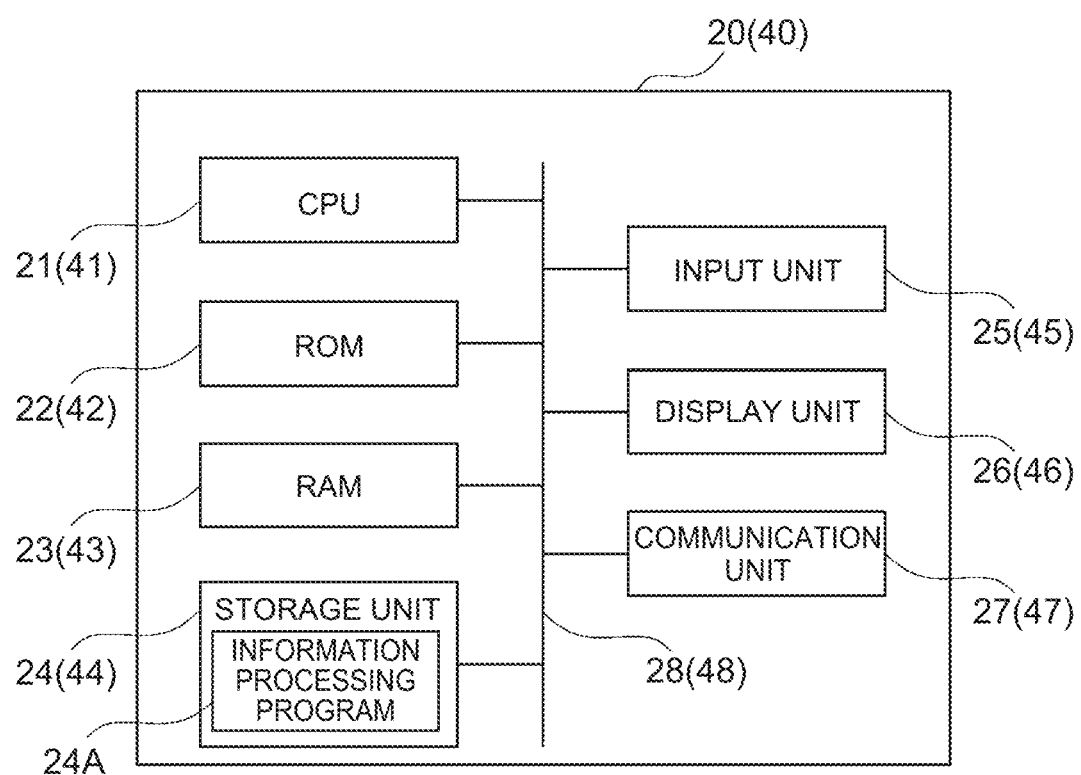
FIG. 2 is a block diagram showing a hardware configuration of an information processing device and a driver terminal according to the embodiment.

Next, a hardware configuration of the information processing device 20 and the driver terminal 40 will be described. FIG. 2 is a block diagram showing the hardware configuration of the information processing device 20 and the driver terminal 40. The information processing device 20 and the driver terminal 40 basically have a general computer configuration, and therefore, the information processing device 20 will be described as a representative.

As shown in FIG. 2, the information processing device 20 includes a central processing unit (CPU) 21, a read only memory (ROM) 22, a random access memory (RAM) 23, a storage unit 24, an input unit 25, a display unit 26 and a communication unit 27. The constituents are connected through a bus 28 in a mutually communicable manner.

The CPU 21, which is a central arithmetic processing unit, executes a variety of programs and controls the units. That is, the CPU 21 reads programs from the ROM 22 or the storage unit 24, and executes programs using the RAM 23 as a working area. The CPU 21 performs controls of the above constituents and a variety of arithmetic processes, in accordance with the programs recorded in the ROM 22 or the storage unit 24.

The ROM 22 contains a variety of programs and a variety of data. The RAM 23 temporarily stores programs or data, as a working area.

The storage unit 24 is constituted by a storage device such as a hard disk drive (HDD), a solid state drive (SSD) or a flash memory, and contains a variety of programs and a variety of data. In the first embodiment, the storage unit 24 contains at least an information processing program 24A for executing a acceptance process and a management process described later.

The input unit 25 includes a pointing device such as a mouse, a keyboard, a microphone, a camera and the like, and is used for a variety of inputs.

For example, the display unit 26 is a liquid crystal display, and displays a variety of information. The display unit 26 may function as the input unit 25 by employing a touch panel technique.

The communication unit 27 is an interface for communicating with other devices. For the communication, for example, a wire communication standard such as Ethernet® or FDDI, or a wireless communication standard such as 4G, 5G or Wi-Fi® is used.

In the execution of the above information processing program 24A, the information processing device 20 executes processes based on the information processing program 24A, using the above hardware resources.

Figure 3:
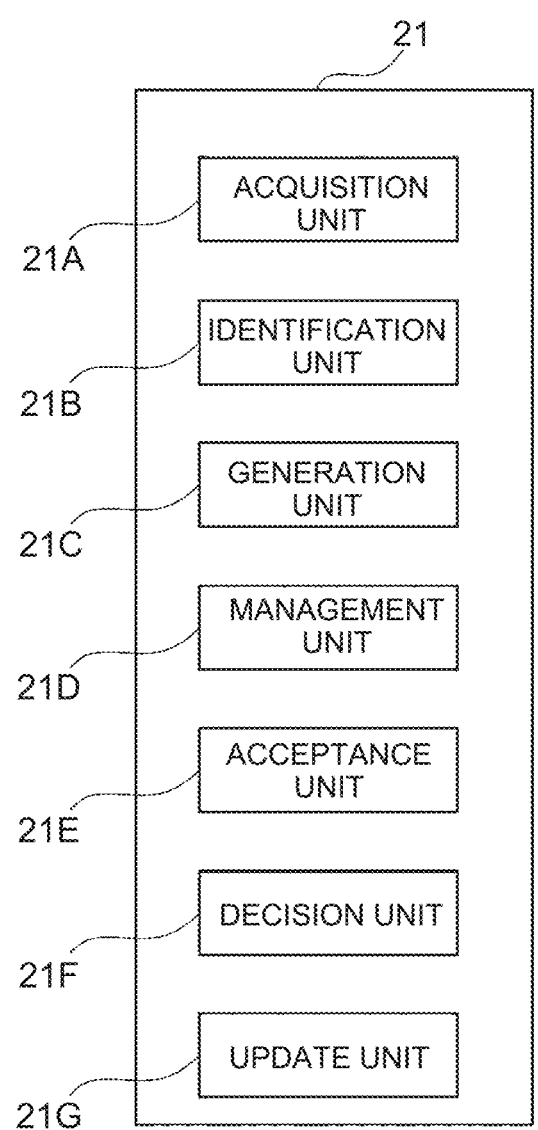
FIG. 3 is a block diagram showing an example of functional constituents of the information processing device according to the embodiment.

Next, functional constituents of the information processing device 20 will be described. FIG. 3 is a block diagram showing an example of the functional constituents of the information processing device 20 according to the first embodiment.

As shown in FIG. 3, the CPU 21 of the information processing device 20 includes an acquisition unit 21A, an identification unit 21B, a generation unit 21C, a management unit 21D, an acceptance unit 21E, a decision unit 21F and an update unit 21G, as functional constituents. Each functional constituent is realized when the CPU 21 reads and executes the information processing program 24A stored in the storage unit 24.

The acquisition unit 21A acquires vehicle information relevant to the vehicle 60. Specifically, as the vehicle information, the acquisition unit 21A acquires the steering angle, acceleration, vehicle speed and blinker operation of the vehicle 60 that are detected by a later-described steering angle sensor 71, an acceleration sensor 72, a vehicle speed sensor 73 and a blinker switch 74 included in the vehicle 60. Further, as the vehicle information, the acquisition unit 21A acquires the engine speed, engine torque, fuel efficiency and accelerator operation of the vehicle 60 that are detected by a later-described ECU 70C included in the vehicle 60. Furthermore, as the vehicle information, the acquisition unit 21A acquires the face image of the driver that is photographed by a later-described camera 76 included in the vehicle 60. The above information is some of the vehicle information that can be acquired from the vehicle 60 by the acquisition unit 21A, and as the vehicle information, the acquisition unit 21A acquires also information relevant to the vehicle 60 and other than the above information, from the vehicle 60.

The identification unit 21B identifies the driver of the vehicle 60 based on the vehicle information acquired by the acquisition unit 21A. As an example, the identification unit 21B identifies the driver of the vehicle 60, by collating the face image of the driver that is acquired as the vehicle information by the acquisition unit 21A, with face images stored in the storage unit 24. At this time, the identification unit 21B identifies the driver of the vehicle 60 by executing a known face authentication process.

The generation unit 21C generates driver information relevant to the driver identified by the identification unit 21B, based on the vehicle information acquired by the acquisition unit 21A. As an example, the driver information is configured to include vehicle speed information relevant to an average vehicle speed of the vehicle 60, fuel efficiency information relevant to an average fuel efficiency of the vehicle 60, driving time information relevant to a cumulative driving time of the vehicle 60, driving distance information relevant to a cumulative driving distance of the vehicle 60, driving evaluation information relevant to a driving evaluation of the driver, driving habit information relevant to a driving habit including the driving awareness, driving attitude and others of the driver, first characteristic information relevant to cognizance and psychological characteristic including the cognitive feature, personality and others of the driver, second characteristic information relevant to sensation and sensory characteristic including the visual power, response characteristic and others of the driver, and attribute information relevant to personal attribute including the sex, age and others of the driver. The driver information may exclude some of the above information, or may be include information other than the above information.

As an example, the generation unit 21C generates the vehicle speed information, the fuel efficiency information, the driving time information, the driving distance information and the driving evaluation information of the driver information, using at least one of the steering angle, acceleration, vehicle speed, blinker operation, engine speed, engine torque, fuel efficiency and accelerator operation of the vehicle 60 that is acquired as the vehicle information by the acquisition unit 21A.

Further, as an example, the generation unit 21C generates the driver habit information, first characteristic information and second characteristic information of the driver information, by combining the face image of the driver with at least one of the steering angle, acceleration, vehicle speed, blinker operation, engine speed, engine torque, fuel efficiency and accelerator operation of the vehicle 60 that is acquired by the acquisition unit 21A as the vehicle information. Furthermore, as an example, the generation unit 21C generates the attribute information of the driver information, using the face image of the driver that is acquired as the vehicle information by the acquisition unit 21A.

The management unit 21D manages a plurality of pieces of driver information relevant to the driver identified by the identification unit 21B. Specifically, in the storage unit 24, the management unit 21D stores driver information that is of the driver information generated by the generation unit 21C and for which a selection of permission of provision is accepted by the acceptance unit 21E, in association with identification information that makes it possible to uniquely identify the driver identified by the identification unit 21B. Further, from the storage unit 24, the management unit 21D deletes driver information that is of the driver information stored in the storage unit 24 and that a selection of deletion is accepted by the acceptance unit 21E.

The acceptance unit 21E accepts a selection about a management method for the driver information by the management unit 21D. In the first embodiment, as the selection about the management method by the management unit 21D, the acceptance unit 21E accepts the selection of driver information for which the driver of the vehicle 60 permits provision and the selection of driver information for which the driver of the vehicle 60 does not permit provision.

The decision unit 21F decides whether to give an advantageous benefit to the driver, based on an evaluation value of the driver. The evaluation value is a point that can be obtained based on the number of pieces of the driver information for which provision is permitted, the number of times of driving of the vehicle 60, and others. The evaluation value is stored in the storage unit 24, and is updated by the update unit 21G. In the first embodiment, as an example, when the total of the evaluation value obtained by the driver exceeds "100", the decision unit 21F makes a decision of giving the above benefit, and sale information about a special vehicle, information relevant to provision of a special service, and others are sent to the driver terminal 40, as the benefit.

The update unit 21G updates the evaluation value stored in the storage unit 24. In the first embodiment, the update unit 21G updates the evaluation value, such that the decision by the decision unit 21F becomes closer to the decision of giving the benefit as the number of pieces of the driver information for which provision is permitted is larger. In the first embodiment, as an example, an evaluation value of "10" can be obtained for one piece of the driver information for which provision is permitted. Therefore, as an example, in the case where the number of pieces of the driver information for which provision is permitted is two, the update unit 21G adds "20" to the evaluation value stored in the storage unit 24.

Figure 4:
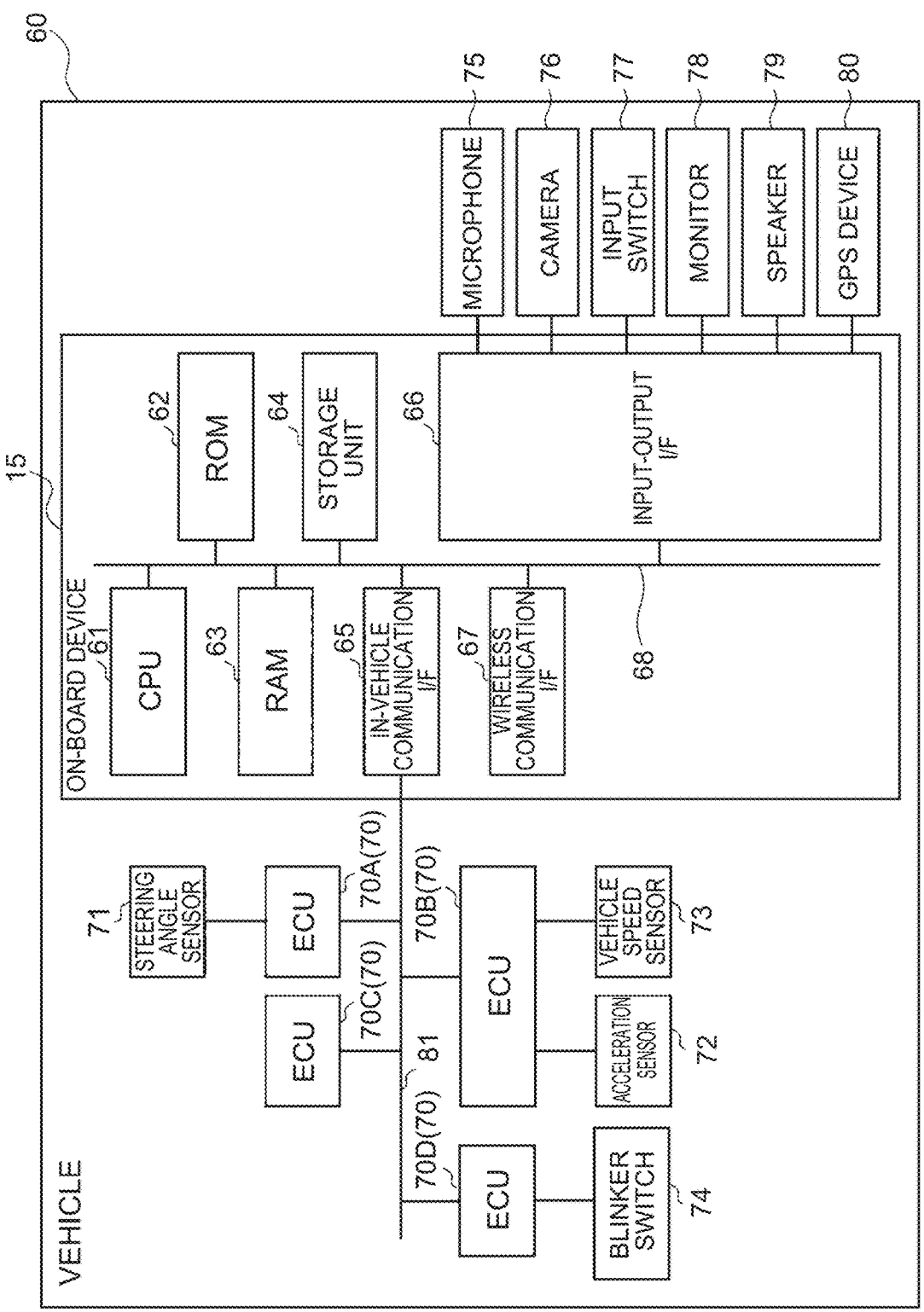
FIG. 4 is a block diagram showing a hardware configuration of a vehicle according to the embodiment.

Next, a hardware configuration of the vehicle 60 will be described. FIG. 4 is a block diagram showing the hardware configuration of the vehicle 60.

As shown in FIG. 4, the vehicle 60 is configured to include an on-board device 15, a plurality of electronic control units (ECUs) 70, the steering angle sensor 71, the acceleration sensor 72, the vehicle sensor 73, the blinker switch 74, a microphone 75, a camera 76, an input switch 77, a monitor 78, a speaker 79 and a GPS device 80.

The on-board device 15 is configured to include a CPU 61, a ROM 62, a RAM 63, a storage unit 64, an in-vehicle communication interface (I/F) 65, an input-output I/F 66 and a wireless communication I/F 67. The CPU 61, the ROM 62, the RAM 63, the storage unit 64, the in-vehicle communication I/F 65, the input-output I/F 66 and the wireless communication I/F 67 are connected through an internal bus 68 in a mutually communicable manner.

The CPU 61, which is a central arithmetic processing unit, executes a variety of programs and controls the units. That is, the CPU 61 reads programs from the ROM 62 or the storage unit 64, and executes programs using the RAM 63 as a working area. The CPU 61 performs controls of the above constituents and a variety of arithmetic processes, in accordance with the programs recorded in the ROM 62 or the storage unit 64.

The ROM 62 contains a variety of programs and a variety of data. The RAM 63 temporarily stores programs or data, as a working area.

The storage unit 64 is constituted by a storage device such as a HDD, a SSD or a flash memory, and contains a variety of programs and a variety of data.

The in-vehicle communication I/F 65 is an interface for connection with the ECU 70. For the interface, a communication standard based on a CAN protocol is used. The in-vehicle communication I/F 65 is connected with an external bus 81.

The ECU 70 is provided with a plurality of ECUs for functions of the vehicle 60, and in the first embodiment, an ECU 70A, an ECU 70B, an ECU 70C and an ECU 70D are provided. The ECU 70A is an ECU for an electronic power steering, for example, and the steering angle sensor 71 is connected with the ECU 70A. Further, the ECU 70B is an ECU for vehicle stability control (VSC), for example, and the acceleration sensor 72 and the vehicle speed sensor 73 are connected with the ECU 70B. A yaw rate sensor may be connected with the ECU 70B, in addition to the acceleration sensor 72 and the vehicle speed sensor 73.

The ECU 70C is an engine ECU, for example, and detects the engine speed and engine torque of the vehicle 60 for controlling an engine. Further, the ECU 70C detects the fuel efficiency based on the fuel flow acquired from unillustrated sensors. Furthermore, the ECU 70C detects the accelerator operation of the vehicle 60. The engine speed, engine torque, fuel efficiency and accelerator operation detected by the ECU 70C are stored in the storage unit 64 and are sent to the information processing device 20 as the vehicle information. Further, the ECU 70D is a steering ECU, for example, and the blinker switch 74 is connected with the ECU 70D. The blinker switch 74 is provided on a steering column for actuating blinkers. The ECU 70D detects the operation of the blinker switch 74 by the driver, as a blinker operation. The blinker operation detected by the ECU 70D is stored in the storage unit 64, and is sent to the information processing device 20 as the vehicle information.

The steering angle sensor 71 is a sensor for detecting the steering angle of a steering wheel. The steering angle detected by the steering angle sensor 71 is stored in the storage unit 64, and is sent to the information processing device 20 as the vehicle information.

The acceleration sensor 72 is a sensor for detecting the acceleration that acts on the vehicle 60. As an example, the acceleration sensor 72 is a triaxial acceleration sensor, and detects an acceleration in a vehicle front-rear direction as an X-axis direction, an acceleration in a vehicle width direction as a Y-axis direction, and an acceleration in a vehicle height direction as a Z-axis direction. The acceleration detected by the acceleration sensor 72 is stored in the storage unit 64, and is sent to the information processing device 20 as the vehicle information.

The vehicle speed sensor 73 is a sensor for detecting the vehicle speed of the vehicle 60. For example, the vehicle speed sensor 73 is a sensor that is provided in a wheel. The vehicle speed detected by the vehicle speed sensor 73 is stored in the storage unit 64, and is sent to the information processing device 20 as the vehicle information.

The input-output I/F 66 is an interface for communicating with the microphone 75, the camera 76, the input switch 77, the monitor 78, the speaker 79 and the GPS device 80 that are equipped in the vehicle 60.

The microphone 75 is a device that is provided on a front pillar, a dashboard or the like in the vehicle 60 and that collects the voice from the driver of the vehicle 60. The microphone 75 may be provided on the later-described camera 76.

As an example, the camera 76 is configured to include a charge coupled device (CCD) image sensor. As an example, the camera 76 is provided on an upper portion of a windshield or a dashboard in the vehicle 60, and is oriented to the driver. The camera 76 photographs a range containing the face of the driver, at least at a time point when an illustrated ignition sensor is turned on and the vehicle 60 starts to travel. The face image of the driver that is photographed by the camera 76 is stored in the storage unit 64, and is sent to the information processing device 20 as the vehicle information. The camera 76 may be connected with the on-board device 15 through the ECU 70 (for example, a camera ECU).

The input switch 77 is a switch that is provided on an instrument panel, a center console, a steering wheel or the like and to which an operation by a finger of the driver is input. As the input switch 77, for example, a push-button numeric keypad, a touch pad or the like can be employed.

The monitor 78 is a liquid crystal monitor that is provided on the instrument panel, a meter panel or the like and that displays a proposal of actuation about a function of the vehicle 60 and an image about the explanation of the function. The monitor 78 may be provided as a touch panel that serves also as the input switch 77.

The speaker 79 is a device that is provided on the instrument panel, the center console, the front pillar, the dashboard or the like and that outputs a proposal of actuation about a function of the vehicle 60 and a voice about the explanation of the function. The speaker 79 may be provided on the monitor 78.

The GPS device 80 is a device that measures the current position of the vehicle 60. The GPS device 80 includes an unillustrated antenna that receives a signal from a GPS satellite. The GPS device 80 may be connected with the on-board device 15 through a car navigation system that is connected with the ECU 70 (for example, a multimedia ECU).

The wireless communication I/F 67 is a wireless communication module for communicating with the information processing device 20. For the wireless communication module, for example, a communication standard such as 5G, LTE and Wi-Fi® is used. The wireless communication I/F 67 is connected to the network N.

Figure 5:
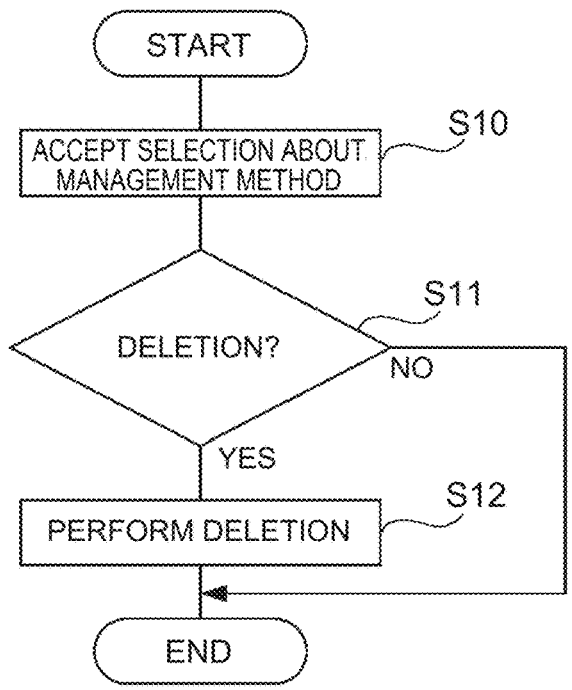
FIG. 5 is a flowchart showing a flow of an acceptance process by the information processing device according to the embodiment.

FIG. 5 is a flowchart showing a flow of an acceptance process in which the information processing device 20 accepts the selection about the management method for the driver information. The CPU 21 reads the information processing program 24A from the storage unit 24, and expands and executes the information processing program 24A on the RAM 23, so that the acceptance process is performed.

In step S10 shown in FIG. 5, the CPU 21 accepts the selection of the driving information for which provision is permitted and the selection of the driver information for which provision is not permitted, as the selection about the management method for the driver information, from the driver of the vehicle 60. Then, the CPU 21 proceeds to step S11. As an example, the CPU 21 accepts the permission or rejection of the provision for each piece of the driver information, in a first acceptance process, and accepts the selection of driver information that is additionally stored in the storage unit 24 or the selection of driver information that is deleted from the driver information stored in the storage unit 24, in second and subsequent acceptance processes.

In step S11, the CPU 21 determines whether the CPU 21 has accepted in step S10 the selection of the driver information that is deleted from the driver information stored in the storage unit 24, and in the case where the CPU 21 determines that the CPU 21 has accepted the selection of the deletion (step S11: YES), the CPU 21 proceeds to step S12. On the other hand, in the case where the CPU 21 determines that the CPU 21 has not accepted the selection of the deletion (step S11: NO), the CPU 21 ends the process.

In step S12, the CPU 21 deletes the driver information for which the CPU 21 has accepted the selection of the deletion in step S10, from the driver information stored in the storage unit 24. Then, the CPU 21 ends the process.

Figure 6:
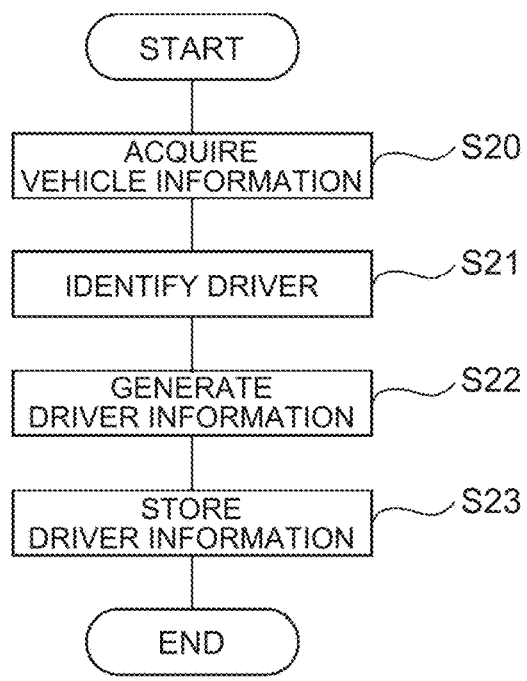
FIG. 6 is a flowchart showing a flow of a management process by the information processing device according to the embodiment.

FIG. 6 is a flowchart showing a flow of a management process in which the information processing device 20 manages the driver information. The CPU 21 reads the information processing program 24A from the storage unit 24, and expands and executes the information processing program 24A on the RAM 23, so that the management process is performed.

In step S20 shown in FIG. 6, the CPU 21 acquires the vehicle information from the vehicle 60. Then, the CPU 21 proceeds to step S21. In the first embodiment, as an example, the vehicle information is periodically sent from the vehicle 60 to the information processing device 20.

In step S21, the CPU 21 executes a known face authentication process by collating the face image of the driver that is included in the vehicle information acquired in step S20, with the face images stored in the storage unit 24, and thereby identifies the driver of the vehicle 60. Then, the CPU 21 proceeds to step S22.

In step S22, the CPU 21 generates the driver information about the driver identified in step S21, based on the vehicle information acquired in step S20. Then, the CPU 21 proceeds to step S23. At this time, the CPU 21 generates the driver information for which the CPU 21 has accepted the selection about the permission of the provision in step S10 of the acceptance process shown in FIG. 5.

In step S23, the CPU 21 stores the driver information generated in step S22, in the storage unit 24, in association with the identification information that makes it possible to uniquely identify the driver identified in step S21. Then, the CPU 21 ends the process.

Next, display examples that are displayed on the display unit 46 of the driver terminal 40 after the acceptance process shown in FIG. 5 is started by the information processing device 20 will be described.

Figure 7:
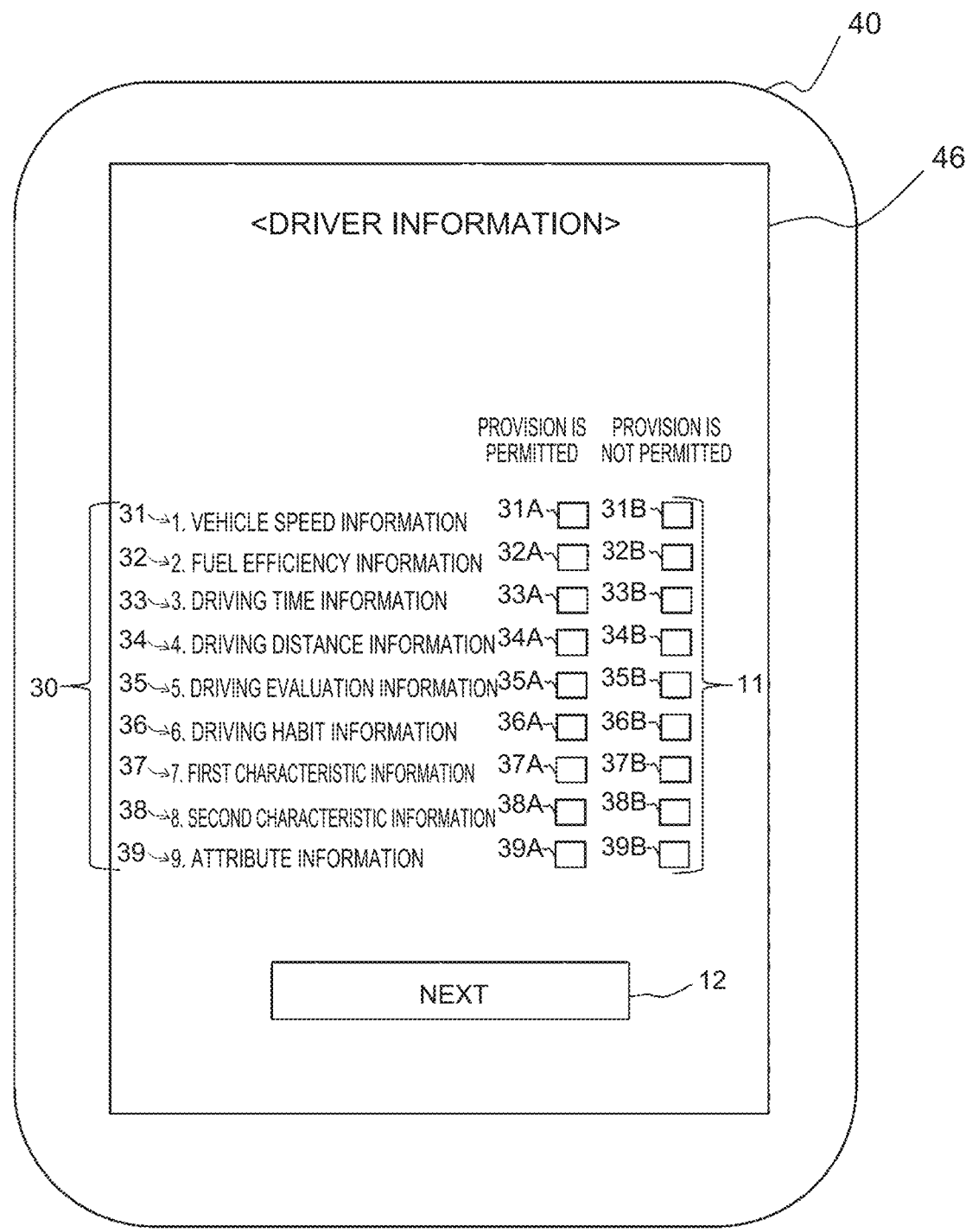
FIG. 7 is a first display example that is displayed on a display unit of the driver terminal according to the embodiment.

FIG. 7 is a first display example that is displayed on the display unit 46 of the driver terminal 40. The CPU 41 of the driver terminal 40 displays the display example shown in FIG. 7 on the display unit 46, in the case where a predetermined Web application is executed in the driver terminal 40 and a previously determined operation is performed to the Web application.

In the display example shown in FIG. 7, an information display portion 30, a checkbox 11 and a NEXT button 12 are displayed.

The information display portion 30 is a portion showing the driver information for which the selection about the management method is accepted. As an example, the information display portion 30 is configured to include a first display portion 31 showing the vehicle speed information as the driver information for which the selection about the management method is accepted, a second display portion 32 showing the fuel efficiency information, a third display portion 33 showing the driving time information, a fourth display portion 34 showing the driving distance information, a fifth display portion 35 showing the driving evaluation information, a sixth display portion 36 showing the driving habit information, a seventh display portion 37 showing the first characteristic information, an eighth display portion 38 showing the second characteristic information, and a ninth display portion 39 showing the attribute information.

The checkbox 11 is a portion where the selection about the management method for the driver information is accepted from the driver. As an example, the checkbox 11 is configured to include first checkboxes 31A, 32A, 33A, 34A, 35A, 36A, 37A, 38A, 39A (referred to as a "first checkbox 31A-39A" hereinafter) where a selection "provision is permitted" by the driver is accepted and second checkboxes 31B, 32B, 33B, 34B, 35B, 36B, 37B, 38B, 39B (referred to as a "second checkbox 31B-39B" hereinafter) where a selection "provision is not permitted" by the driver is accepted. In the first embodiment, either the first checkbox 31A-39A or the second checkbox 31B-39B can be selected.

The NEXT button 12 is a button for changing the display content of the display unit 46. The NEXT button 12 cannot be operated until the first checkbox 31A or the second checkbox 31B is selected, the first checkbox 32A or the second checkbox 32B is selected, the first checkbox 33A or the second checkbox 33B is selected, the first checkbox 34A or the second checkbox 34B is selected, the first checkbox 35A or the second checkbox 35B is selected, the first checkbox 36A or the second checkbox 36B is selected, the first checkbox 37A or the second checkbox 37B is selected, the first checkbox 38A or the second checkbox 38B is selected, and the first checkbox 39A or the second checkbox 39B is selected.

Figure 8:
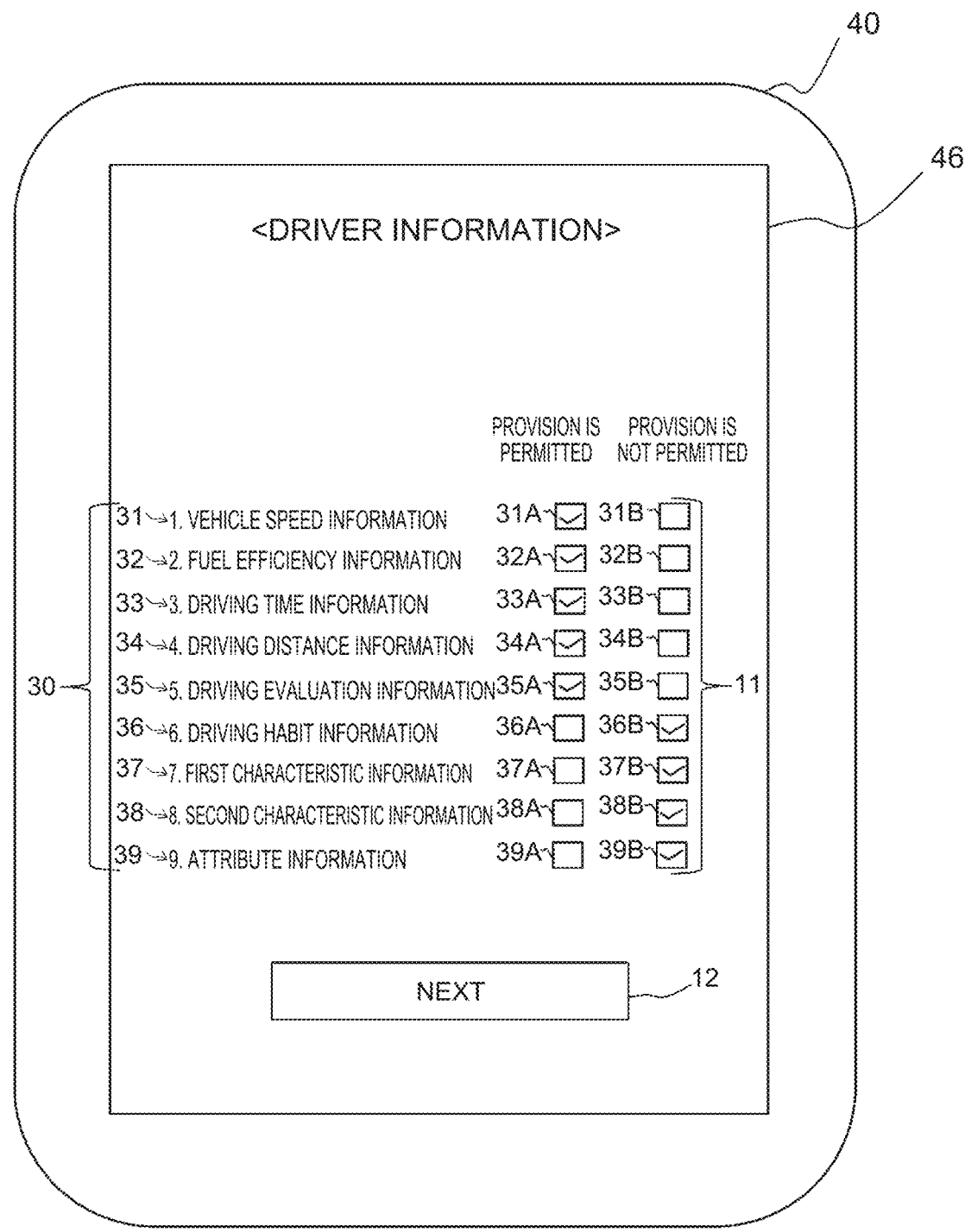
FIG. 8 is a second display example that is displayed on the display unit of the driver terminal according to the embodiment.

FIG. 8 is a second display example that is displayed on the display unit 46 of the driver terminal 40, In the checkbox 11 shown in FIG. 8, check marks are put on the first checkboxes 31A, 32A, 33A, 34A, 35A and the second checkboxes 36B, 37B, 38B, 39B. Thereby, the display example shown in FIG.

8 shows that the driver information for which the selection "provision is permitted" by the driver is accepted is the vehicle speed information, the fuel efficiency information, the driving time information, the driving distance information and the driving evaluation information and the driver information for which the selection "provision is not permitted" by the driver is accepted is the driving habit information, the first characteristic information, the second characteristic information and the attribute information.

Figure 9:
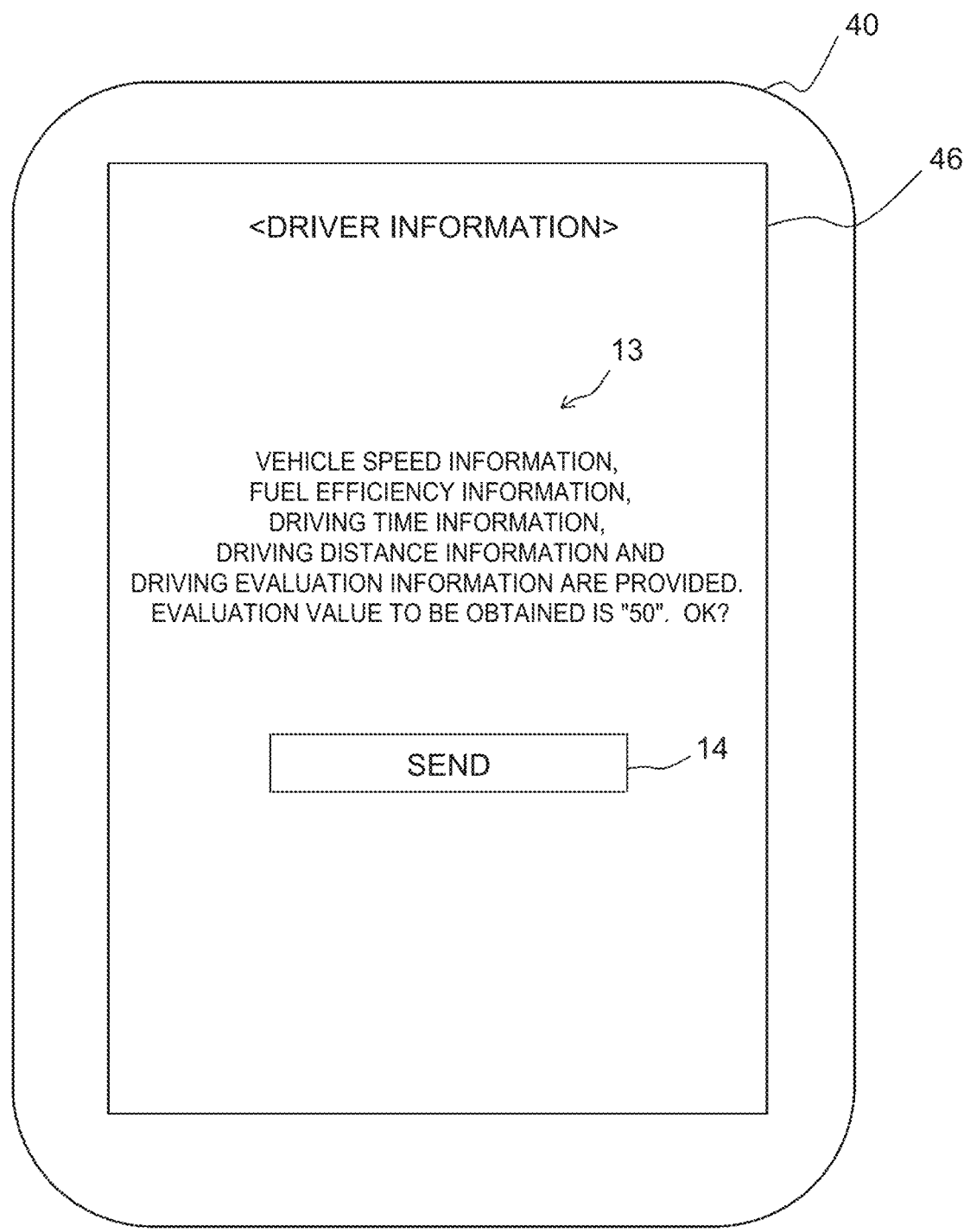
FIG. 9 is a third display example that is displayed on the display unit of the driver terminal according to the embodiment.

FIG. 9 is a third display example that is displayed on the display unit 46 of the driver terminal 40. The display example shown in FIG. 9 shows a state after the NEXT button 12 is operated in the display example shown in FIG. 8.

In the display example shown in FIG. 9, a message display portion 13 and a SEND button 14 are displayed.

The message display portion 13 is a portion where a message to the driver is displayed. As an example, a message "vehicle speed information, fuel efficiency information, driving time information, driving distance information and driving evaluation information are provided. Evaluation value to be obtained is "50". OK?" is displayed at the message display portion 13 shown in FIG. 9.

The SEND button 14 is a button for sending the selection result of the selection about the management method for the driver information by the driver. In the case where the SEND button 14 shown in FIG. 9 is operated, the CPU 41 of the driver terminal 40 sends, to the information processing device 20, information indicating that the driver information for which the selection "provision is permitted" by the driver is accepted is the vehicle speed information, the fuel efficiency information, the driving time information, the driving distance information and the driving evaluation information and the driver information for which the selection "provision is not permitted" by the driver is accepted is the driving habit information, the first characteristic information, the second characteristic information and the attribute information, as the above selection result.

As described above, in the first embodiment, the CPU 21 acquires the vehicle information relevant to the vehicle 60. Further, the CPU 21 identifies the driver of the vehicle 60 based on the acquired vehicle information. Further, the CPU 21 manages the plurality of pieces of driver information relevant to the identified driver. Then, the CPU 21 accepts the selection about the management method for the driver information. Thereby, in the first embodiment, it is possible to collect the driver information with consideration for personal information when the driver information is used for analysis or the like.

Further, in the first embodiment, the CPU 21 decides whether to give an advantageous benefit to the driver, based on the evaluation value of the driver. Then, the CPU 21 updates the evaluation value, such that the decision becomes closer to the decision of giving the benefit as the number of pieces of the driver information for which provision is permitted is larger. For example, in the first embodiment, in the case where the number of pieces of the driver information for which provision is permitted is one, an evaluation value of "10" can be obtained, and in the case where the number of pieces of the driver information for which provision is permitted is two, an evaluation value of "20" can be obtained. Then, the CPU 21 updates the evaluation value stored in the storage unit 24, by adding a value corresponding to the number of pieces of the driver information for which provision is permitted.

By the above configuration, in the first embodiment, as the number of pieces of the driver information for which provision is permitted is larger, the decision becomes closer to the decision of giving the benefit, and therefore it is possible to give a motivation to provide more pieces of the driver information.

Second Embodiment

Next, a second embodiment will be described while portions overlapping with other embodiments are omitted or simplified.

In the second embodiment, the acceptance unit 21E accepts a selection of a single plan from a plurality of plans about combination of the driver information managed by the management unit 21D. Then, the management unit 21D manages the driver information that corresponds to the single plan accepted by the acceptance unit 21E.

Figure 10:
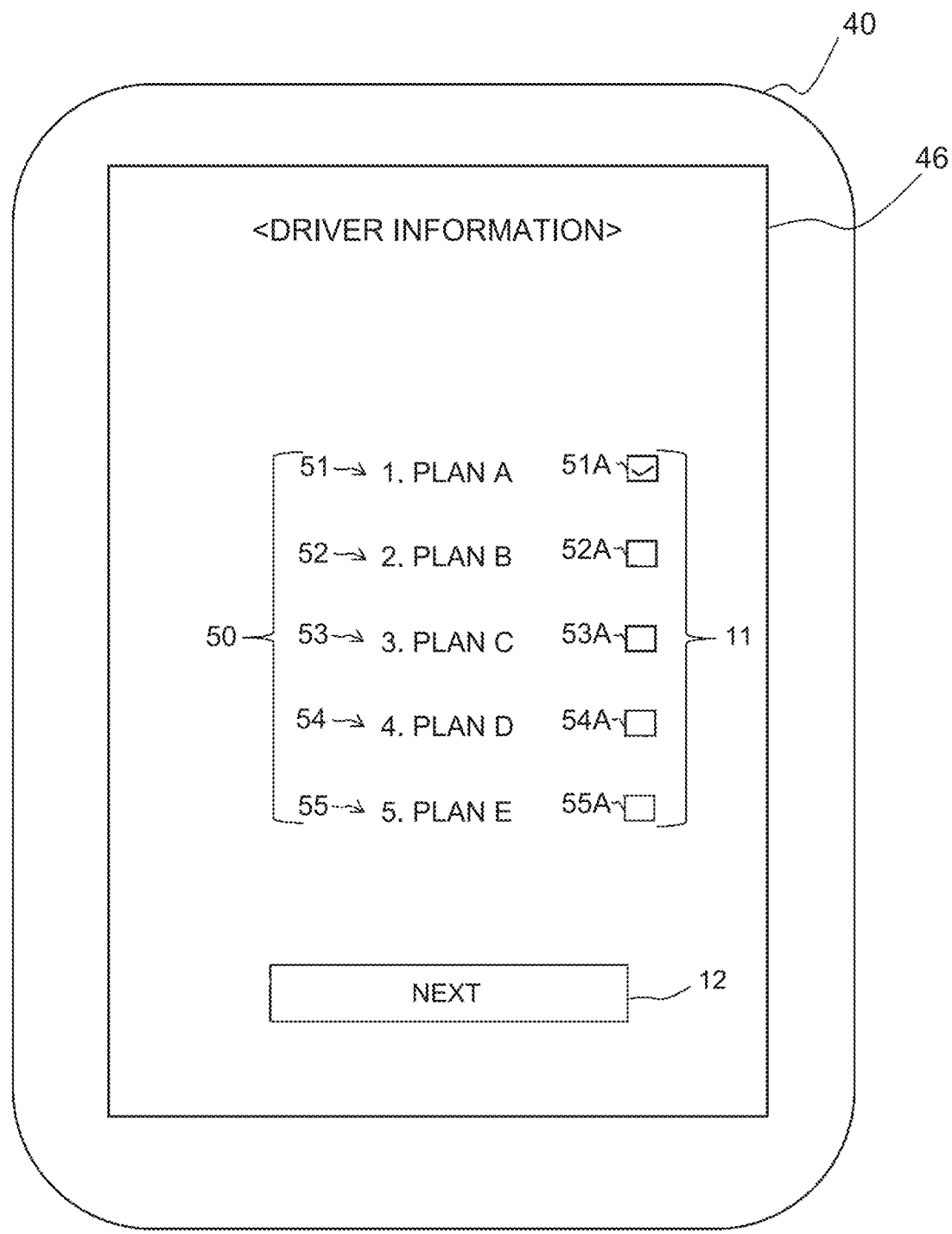
FIG. 10 is a fourth display example that is displayed on the display unit of the driver terminal according to the embodiment.

FIG. 10 is a fourth display example that is displayed on the display unit 46 of the driver terminal 40. The CPU 41 of the driver terminal 40 displays the display example shown in FIG. 10 on the display unit 46, in the case where a predetermined Web application is executed in the driver terminal 40 and a previously determined operation is performed to the Web application.

In the display example shown in FIG. 10, a plan display portion 50, a checkbox 11 and the NEXT button 12 are displayed.

The plan display portion 50 is a portion showing a plurality of plans about the combination of the driver information that is stored in the storage unit 24. As an example, the plan display portion 50 is configured to include a first display portion 51, a second display portion 52, a third display portion 53, a fourth display portion 54 and a fifth display portion 55.

The first display portion 51 is a portion showing a plan A of the plurality of plans. As an example, in the plan A, the combination of the driver information stored in the storage unit 24 is configured by the vehicle speed information, the fuel efficiency information, the driving time information, the driving distance information and the driving evaluation information.

The second display portion 52 is a portion showing a plan B of the plurality of plans. As an example, in the plan B, the combination of the driver information stored in the storage unit 24 is configured by the fuel efficiency information, the driving time information, the driving distance information and the driving evaluation information.

The third display portion 53 is a portion showing a plan C of the plurality of plans. As an example, in the plan C, the combination of the driver information stored in the storage unit 24 is configured by the driving time information, the driving distance information and the driving evaluation information.

The fourth display portion 54 is a portion showing a plan D of the plurality of plans. As an example, in the plan D, the combination of the driver information stored in the storage unit 24 is configured by the driving habit information, the first characteristic information, the second characteristic information and the attribute information.

The fifth display portion 55 is a portion showing a plan E of the plurality of plans. As an example, in the plan E, the combination of the driver information stored in the storage unit 24 is configured by the first characteristic information, the second characteristic information and the attribute information.

As an example, the checkbox 11 shown in FIG. 10 is configured to include a checkbox 51A corresponding to the plan A, a checkbox 52A corresponding to the plan B, a checkbox 53A corresponding to the plan C, a checkbox 54A corresponding to the plan D and a checkbox 55A corresponding to the plan E. In the display example shown in FIG. 10, a check mark is put on the checkbox 51A. Thereby, the display example shown in FIG. 10 shows that the single plan selected from the plurality of plans is the plan A.

As described above, in the information processing system 10 in the second embodiment, the plurality of plans (the plan A, the plan B, the plan C, the plan D and the plan E) different in the combination of the driver information stored in the storage unit 24 is previously prepared, and a single plan is selected from the plurality of plans displayed on the driver terminal 40, by the driver. Thereby, in the second embodiment, by accepting the selection of the single plan from the plurality of plans, it is possible to reduce the complication when the selection about the management method is performed for each piece of the driver information.

Third Embodiment

Next, a third embodiment will be described while portions overlapping with other embodiments are omitted or simplified.

In the third embodiment, when driver information is provided to the outside, the acceptance unit 21E accepts a permission or rejection of the provision of the driver information to the outside. Specifically, when the driver information is provided to the outside, the acceptance unit 21E accepts the permission or rejection of the provision to the outside, for each piece of the driver information. Herein, the "outside" means an external device that is different from the information processing device 20, and means an external device possessed by a business operator that is different from the predetermined business operator possessing the information processing device 20.

Figure 11:
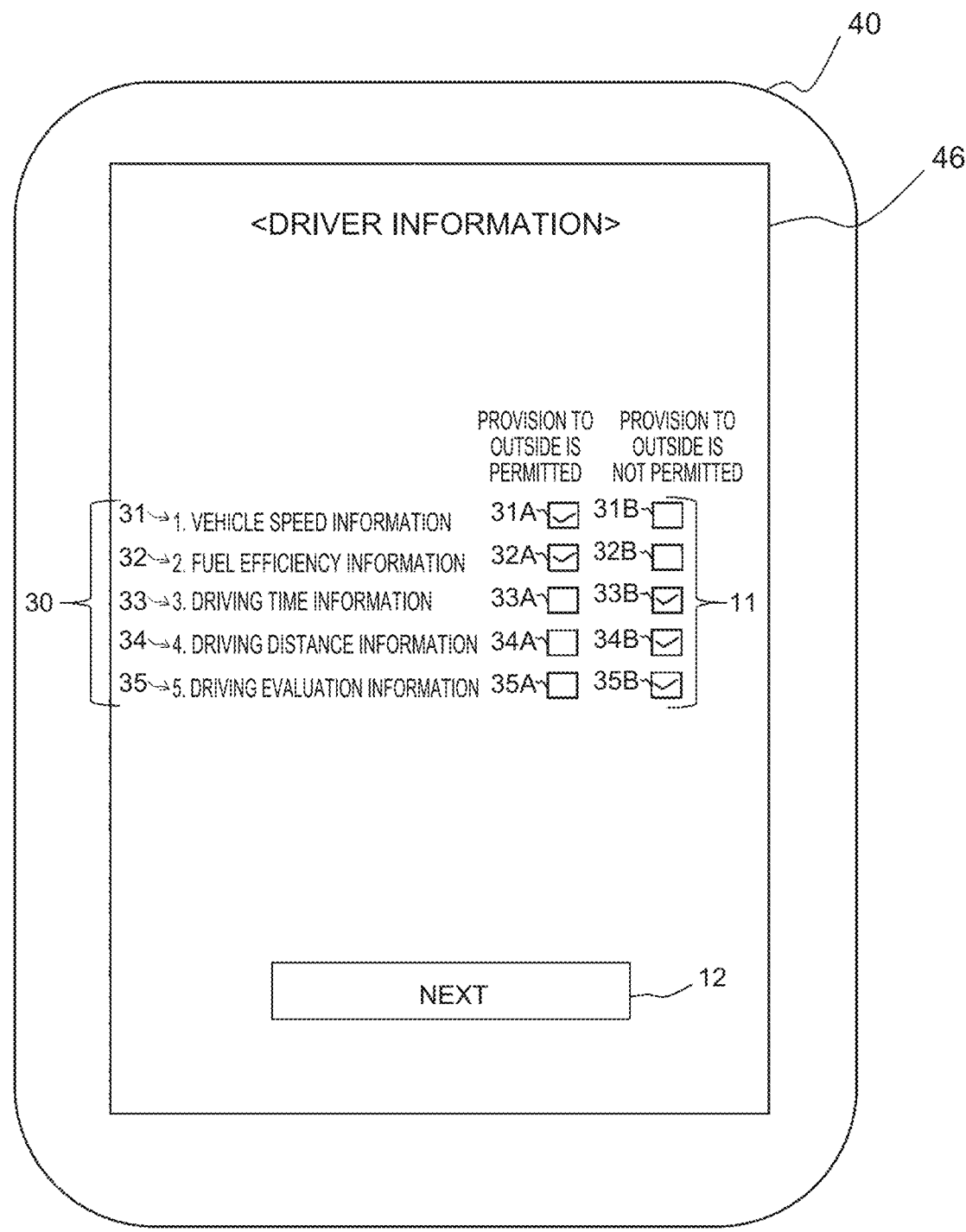
FIG. 11 is a fifth display example that is displayed on the display unit of the driver terminal according to the embodiment.

FIG. 11 is fifth display example that is displayed on the display unit 46 of the driver terminal 40. The CPU 41 of the driver terminal 40 displays the display example shown in FIG. 11 on the display unit 46, in the case where a predetermined Web application is executed in the driver terminal 40 and a previously determined operation is performed to the Web application.

In the display example shown in FIG. 11, an information display portion 30, a checkbox 11 and the NEXT button 12 are displayed.

The information display portion 30 shown in FIG. 11 is a portion showing driver information that is stored in the storage unit 24 and for which the permission or rejection of the provision to the outside is accepted. As an example, at the information display portion 30, the vehicle speed information, the fuel efficiency information, the driving time information, the driving distance information and the driving evaluation information for which the selection "provision is permitted" by the driver is accepted and that are sent to the information processing device 20 as the selection result when the SEND button 14 shown in FIG. 9 is operated are displayed on the first display portion 31, the second display portion 32, the third display portion 33, the fourth display portion 34 and the fifth display portion 35, respectively.

In the checkbox 11 shown in FIG. 11, check marks are put on the first checkboxes 31A, 32A and the second checkboxes 33B, 34B, 35B. Thereby, the display example shown in FIG. 11 shows that the driver information that is of the driver information stored in the storage unit 24 and for which the selection of the permission of the provision to the outside by the driver is accepted is configured by the vehicle speed information and the fuel efficiency information. Further, the display example shown in FIG. 11 shows that the driver information that is of the driver information stored in the storage unit 24 and for which the selection of the rejection of the provision to the outside by the driver is accepted is configured by the driving time information, the driving distance information and the driving evaluation information.

By the above configuration, in the third embodiment, it is possible to select the permission or rejection of the provision of the driver information to the external device that is different from the information processing device 20. Specifically, in the third embodiment, for each piece of the driver information, it is possible to select the permission or rejection of the provision of the driver information to the external device that is different from the information processing device 20.

Others

In the above embodiments, the kind of the driver of the vehicle 60 in the information processing system 10 has not been mentioned. The driver may be a driver of a business operator that operates the vehicle, as exemplified by a taxi company and a transport company, or alternatively, may be a general driver that privately drives the vehicle.

In the above embodiments, the driver terminal 40 is a portable terminal that is possessed by the driver of the vehicle 60, but without being limited to this, the driver terminal 40 may be a server computer or a general-purpose computer device such as a PC.

In the above embodiments, the CPU 21 of the information processing device 20 identifies the driver of the vehicle 60 by collating the face image of the driver that is photographed by the camera 76 with the face images stored in the storage unit 24, but without being limited to this, may identify the driver of the vehicle 60 using the vehicle information other than the face image of the driver that is acquired from the vehicle 60.

In the above embodiments, in the case where the CPU 21 of the information processing device 20 accepts the selection of driver information that is deleted from the driver information stored in the storage unit 24 in the second and subsequent acceptance processes, the CPU 21 may initialize the evaluation value stored in the storage unit 24 to "0", or may subtract the evaluation value depending on the number of deletions. Further, in the case where the CPU 21 accepts the selection of driver information that is additionally stored in the storage unit 24 in the second and subsequent acceptance processes, the CPU 21 may add the evaluation value stored in the storage unit 24, depending on the number of additions.

In the above embodiments, the CPU 21 of the information processing device 20 generates all of the driver information relevant to the identified driver, based on the acquired vehicle information, but without being limited to this, some of the driver information may be information that is input by the driver. As an example, the attribute information of the driver information may be information that is input by the driver oneself, instead of generating the attribute information by estimating the sex, age and others of the driver using the face image of the driver that is acquired as the vehicle information.

In the above embodiments, the driver of the vehicle 60 performs the selection about the management method for the driver information, using the driver terminal 40, but without being limited to this, another user other than the driver of the vehicle 60 may perform the selection about the management method for the driver information. As an example, in the case where the driver of the vehicle 60 is a driver of the business operator that operates the vehicle, a manager that manages the driver may perform the selection about the management method for the driver information, using a manager terminal that is possessed by the manager.

In the above embodiments, the acceptance process and management process that are executed by the CPU 21 reading software (programs) may be executed by various processors other than the CPU. In this case, examples of the processors include a programmable logic device (PLD) in which the circuit configuration can be changed after the production, as exemplified by a field-programmable gate array (FPGA), and a dedicated electric circuit that is a processor having a specially designed circuit configuration for executing a particular process, as exemplified by an application specific integrated circuit (ASIC). Further, the acceptance process and the management process may be executed by one of the various processors, or may be executed by a combination of two or more processors of the same kind or different kinds (for example, a combination of a plurality of FPGAs or a combination of a CPU and a FPGA). Further, each hardware structure of the various processors, more specifically, is an electric circuit in which circuit elements such as semiconductor elements are combined.

Further, in the above embodiments, a configuration in which the information processing program 24A is previously stored (installed) in the storage unit 24 has been described, but the present disclosure is not limited to this. The information processing program 24A may be provided while being recorded in a recording medium (storage medium) such as a compact disk read only memory (CD-ROM), a digital versatile disk read only memory (DVD-ROM) and a universal serial bus (USB) memory. Further, the information processing program 24A may be downloaded from an external device through the network N.

What is claimed is:

1. An information processing system comprising:
    a non-transitory computer readable medium;
    a plurality of vehicle mounted sensors; and
    at least one processor connected to the non-transitory computer readable medium, wherein the processor is configured to communicate with the plurality of vehicle mounted sensors, and the processor is configured to:
        acquire vehicle information relevant to a vehicle from at least one of the plurality of vehicle mounted sensors;
        identify a driver of the vehicle based on the acquired vehicle information;
        manage a plurality of pieces of driver information relevant to the identified driver; and
        accept a selection about a management method for the driver information, wherein the driver information includes:
            vehicle speed information relevant to an average vehicle speed of the vehicle,
            fuel efficiency information relevant to an average fuel efficiency of the vehicle,
            driving time information relevant to a cumulative driving time of the vehicle,
            driving distance information relevant to a cumulative driving distance of the vehicle,
            driving evaluation information relevant to a driving evaluation of the driver,
            driving habit information relevant to a driving habit including driving awareness,
            driving attitude of the driver,
            first characteristic information relevant to cognizance and psychological characteristic including a cognitive feature of the driver,
            personality of the driver,
            second characteristic information relevant to sensation and sensory characteristic including a visual power of the driver,
            response characteristic of the driver, and
            attribute information relevant to personal attribute including the sex and age of the driver.

2. The information processing system according to claim 1, wherein the at least one processor is further configured to:
    decide whether to give an advantageous benefit to the driver, based on an evaluation value of the driver; and
    update the evaluation value, such that the decision whether to give the advantageous benefit becomes closer to a decision of giving the benefit as a number of pieces of the driver information is larger.

3. The information processing system according to claim 1, wherein the at least one processor is further configured to:
    accept a selection of a single plan from a plurality of plans about combination of the driver information; and
    manage the driver information that corresponds to the single plan accepted.

4. The information processing system according to claim 1, wherein
    when the driver information is provided to an outside, the at least one processor is configured to accept a permission or rejection of provision of the driver information to the outside.

5. The information processing system according to claim 4, wherein
    when the driver information is provided to the outside, the at least one processor is configured to accept the permission or rejection of the provision to the outside, for each piece of the driver information.

6. The information processing system according to claim 1, wherein the at least one processor is configured to:
    acquire a face image of the driver of the vehicle,
    identify the driver by matching the face image of the driver with a stored face image stored,
    decide whether to give an advantageous benefit to the driver based on an evaluation value of the driver, wherein the evaluation value is based on a number of pieces of the driver information for which provision is permitted,
    update the evaluation value, such that the decision whether to give the advantageous benefit becomes closer to a decision of giving the benefit as the number of pieces of the driver information for which provision is permitted increases.

7. The information processing system according to claim 6, wherein the at least one processor is configured to:
    instruct the non-transitory medium to store a plurality pieces of driver information and delete driver information from the storage unit,
    accept the selection of driver information for which the driver of the vehicle permits provision and the selection of driver information for which the driver of the vehicle does not permit provision, and selection of driver information to be deleted from the driver information,
    when the at least one processor accepts the selection of the driver information to be deleted from the driver information, the at least one processor is configured to update the evaluation value of the driver such that the decision by the decision unit becomes farther to the decision of giving the benefit depending on a number of deletions, and when the at least one processor accepts the selection of driver information to be additionally stored in the storage unit, the at least one processor is configured to update the evaluation value of the driver such that the decision by the decision unit becomes closer to the decision of giving the benefit depending on a number of additions.

8. The information processing system according to claim 1, wherein the driver is an operator of the vehicle, and the at least one processor accepts the selection of driver information for which the driver of the vehicle permits provision and the selection of driver information for which the driver of the vehicle does not permit provision.

* * * * *